US005988816A

United States Patent [19]

Quadri

[11] Patent Number: 5,988,816

[45] Date of Patent: Nov. 23, 1999

[54] LIGHT-BEAM PROJECTING DEVICE

[75] Inventor: Pasquale Quadri, Albano Sant'Alessandro, Italy

[73] Assignee: Clay Paky S.p.A., Pedrengo, Italy

[21] Appl. No.: 09/045,159

[22] Filed: Mar. 19, 1998

[30] Foreign Application Priority Data

Mar. 20, 1997 [IT] Italy .................................. TO97A0237

[51] Int. Cl.[6] ...................................................... G03B 21/14

[52] U.S. Cl. .................................. 353/29; 353/50; 353/94

[58] Field of Search .................................. 353/62, 42, 43, 353/44, 29, 30, 31, 35, 48, 51, 99, 94, 101, 46, 50; 359/618, 629

[56] References Cited

U.S. PATENT DOCUMENTS 4,006,970 2/1977 Slater et al. ............................ 350/285
4,125,843 11/1978 Whitby ...................................... 346/17
4,196,461 4/1980 Geary ...................................... 362/259
4,814,800 3/1989 Lavinsky et al. .......................... 353/50
5,311,335 5/1994 Crabtree .................................... 359/22
5,526,063 6/1996 Joubert et al. .......................... 348/744
5,526,076 6/1996 Walker ...................................... 353/43
5,572,375 11/1996 Crabtree, IV ........................... 359/858

FOREIGN PATENT DOCUMENTS 0 684 421 A1 11/1995 European Pat. Off. ........... F21P 5/02
2 249 164 4/1992 United Kingdom .............. F21P 3/00

*Primary Examiner*—William C. Dowling
*Attorney, Agent, or Firm*—Brinks Hofer Gilson & Lione

[57] ABSTRACT

The projector includes a first light source for generating a light beam; a succession of functional assemblies for imparting special light effects to the light beam; an output mirror for deflecting the light beam in a controlled manner; a laser source for generating a laser beam; a controlled-deflection optical unit for controlled deflection of the laser beam; and a mirror for superimposing the laser beam on the light beam. The projector emits a light beam of predetermined color and shape, which may be directed in a controlled manner, and in which is visible a beam of greater intensity and predetermined color, by which to form writing or images on illuminated targets.

11 Claims, 1 Drawing Sheet

LIGHT-BEAM PROJECTING DEVICE

BACKGROUND OF THE INVENTION

The present invention relates to a light-beam projecting device which may be used, for example, for discotheques, television or film studios, concert stages, dance-halls or theatres.

For producing special lighting effects in halls or on stages, projectors are normally used comprising various elements for controlling the intensity, colour, direction and section of the light beams and projecting them correctly inside the hall.

Known projectors normally emit one beam, which is directed on to a fixed target or deflected in controlled manner by means of one or more powered mirrors.

For producing different optical effects, use is also made of laser beams, which are reflected one or more times to produce given light patterns.

SUMMARY OF THE INVENTION

It is an object of the present invention to provide a straightforward, low-cost light-beam projecting device by which to achieve novel optical effects.

According to the present invention, there is provided a light-beam projecting device comprising a first light source for generating a first light beam; and light processing means for imparting predetermined optical properties to said first light beam.

The device further comprises a second light source for generating a second light beam; and superimposing means for superimposing said second light beam on said first light beam.

BRIEF DESCRIPTION OF THE DRAWINGS

A preferred non-limiting embodiment of the present invention will be described by way of example with reference to the accompanying drawings, in which.

DETAILED DESCRIPTION OF THE INVENTION

Figure 1:
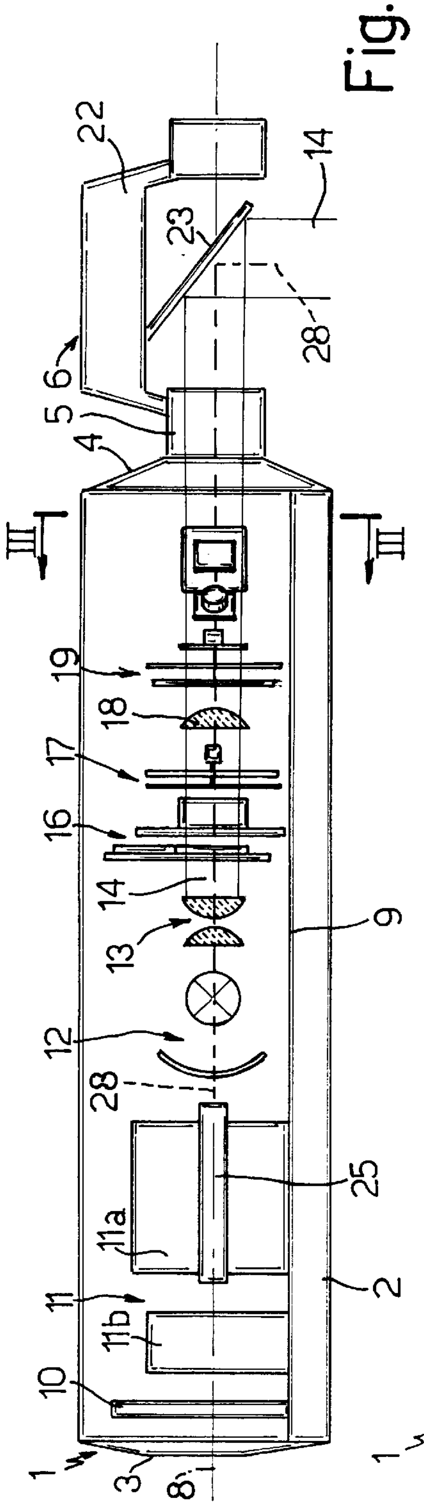
FIG. 1 shows a longitudinal section of the projector according to the invention.
Figure 2:
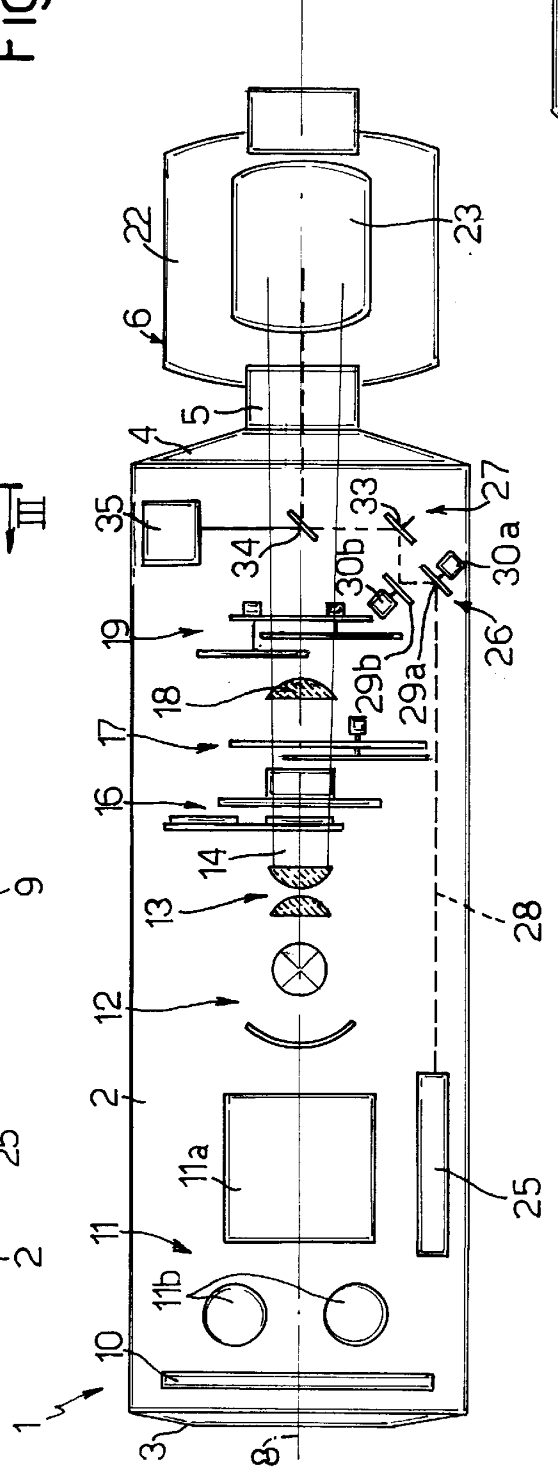
FIG. 2 shows a longitudinal section, in a plane perpendicular to the FIG. 1 plane, of the projector according to the invention.

Number 1 in FIGS. 1 and 2 indicates a light-beam projector which may be used, for example, for discotheques, television or film studios, concert stages, dance-halls or theatres. Projector 1 comprises a substantially prismatic outer casing 2 closed at one end by a rear cover 3, and at the other end by a front cover 4 terminating with a sleeve 5 fitted with a light deflecting device 6 described later on.

Casing 2 has a longitudinal axis 8, and a flat bottom wall 9 (FIG. 1) fitted removably to casing 2.

From rear cover 3 to front cover 4, casing 2 houses the following functional units of projector 1: an electronic control unit 10; an electric power supply unit 11; a light source 12; and an optical unit 13 for concentrating the light emitted by light source 12 into a light beam 14 of predetermined width and traveling along axis 8.

Casing 2 also houses the following functional units for producing special light-beam effects: a first so-called Iris-Gobos assembly 16 for varying the width and shaping light beam 14; a second assembly 17 of filters for varying the colour of the light emitted; a lens 18 for focusing Iris-Gobos assembly 16; and a third assembly 19 of filters and diffusers for multiplying the image and/or producing a light-diffusion or so-called Frost effect.

Light deflecting device 6 is known, and comprises a support 22 fixed in angularly-adjustable manner to sleeve 5; and a mirror 23 fitted to support 22 and having a first angular movement (tilt) about a first principal axis to produce a maximum angle of reflection of 110°, and a second angular movement (pan) about a second principal axis to produce a maximum angle of reflection of 150°.

A major aspect of the invention is that projector 1 also comprises a laser light source 25 (e.g. a commercial He—Ne or $CO_2$ or argon laser) for emitting a laser beam 28; a controlled-light-deflecting optical unit 26; and a light-directing optical unit 27.

Laser source 25 is located to the side of supply unit 11, far enough away from light source 12 to prevent overheating, and is so oriented as to emit laser beam 28 towards front cover 4 and parallel to axis 8.

Optical unit 26 is known, and comprises a pair of mirrors **29*a*, 29*b* fitted to the ends of the output shafts of respective galvanometers 30*a*, 30*b*. Mirror 29*a* is located between laser source 25 and front cover 4, along the path of laser beam 28 and in the gap between front cover 4 and third assembly 19 of filters and diffusers, and is inclined with respect to the path of laser beam 28 so as to reflect laser beam 28 towards axis 8. Mirror 29*b* is located close to mirror 29*a*, along the path connecting mirror 29*a* to axis 8, and is so inclined as to receive and reflect laser beam 28 once more towards front cover 4**.

Galvanometers **30*a* and 30*b* are controlled by a processor (not shown) to move mirrors 29*a* and 29*b* in controlled manner with respect to each other, and so deflect laser beam 28 in controlled manner when laser source 25** is on.

Light-directing optical unit 27 comprises a fixed mirror 33 and a movable mirror 34. Fixed mirror 33 is interposed between mirror **29*b* and front cover 4, and provides for receiving and reflecting laser beam 28 once more towards axis 8; and mirror 34 is located along axis 8 and provides for receiving laser beam 28 reflected by mirror 33, and for reflecting it along axis 8 on to mirror 23. In other words, mirror 34 provides for superimposing laser beam 28 on light beam 14 issuing from projector 1**.

Optical units 26 and 27 are so positioned that the last mirror 34 is located at the focal plane of lens 18, which position, according to the laws of optics, provides for minimizing the shadow cone generated by mirror 34 in light beam 14.

Figure 3:
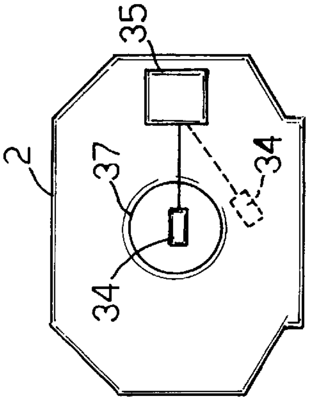
FIG. 3 shows a cross section along line III—III of the FIG. 1 projector, with parts removed for clarity.

Mirror 34 is fitted to an actuating device 35 for moving mirror 34, as shown in FIG. 3, between the previously described position defining a first operating position, and a second operating position—indicated by the dash line—in which it is located outside the projection region—indicated by 37—of light beam 14. When mirror 34 is in the second position, laser beam 28 is not reflected and is therefore excluded from the outgoing light.

The projector described operates as follows.

When the projector is on, the light emitted by light source 12 is formed by optical unit 13 into a light beam 14, which is directed along axis 8, through assemblies 16, 17, lens 18 and assembly 19, and out of projector 1 with predetermined optical properties. At the same time, laser source 25 emits laser beam 28, which is deflected in controlled manner by mirrors 29*a*, 29*b* and directed by mirror 33 on to mirror 34, which, if in the first operating position, in turn reflects and superimposes laser beam 28 on light beam 14. The whole defined by light beam 14 and laser beam 28 therefore impinges on output mirror 23 and is deflected in controlled manner.

In other words, projector 1 emits a light beam of predetermined shape and colour, defined by light beam 14 and in which is visible a light beam of greater intensity and predetermined colour and defined by laser beam 28. Light beam 14 may be directed in any direction within the maximum deflection range of mirror 23, while confining laser beam 28 within itself at all times. Moreover, by virtue of controlled-deflection optical unit 26, laser beam 28 may form writing or images on the lighted target.

If mirror 34 is moved by actuating device 35 into the second position, laser beam 28 is not superimposed on light beam 14, and projector 1 emits beam 14 only.

Conversely, projector 1 may be operated with laser source 25 on and the light source off to emit laser beam 28 only.

The projector according to the invention therefore provides, in a straightforward low-cost manner, for achieving a novel visual effect, the necessary technology for which may be integrated easily into known projectors with no major structural alterations required.

Clearly, changes may be made to the projecting device as described and illustrated herein without, however, departing from the scope of the present invention.

For example, mirrors 29*a*, 29*b* may be fitted to step or direct-current motors as opposed to galvanometers.

Laser source 25 may be replaced by a noncoherent light source and an optical unit similar to unit 13, to generate a secondary beam to superimpose on main beam 14 in the same way as described above; and the secondary beam may obviously be subjected to various optical effects similar to or differing from those of main beam 14.

Finally, a projector may be devised with a number of both laser and noncoherent-light secondary beams.

I claim:

1. An entertainment light-beam projecting device for producing special optical effects, comprising a casing (2), a first light source (12) housed in said casing (2) for generating a first light beam (14); and light processing means (16, 17, 18, 19) for imparting predetermined optical properties to said first light beam (14);

said device being characterized by further comprising a second light source (25) housed in said casing (2), adjacent and in close proximity to said first light source (12), for generating a second light beam (28); superimposing means (34) for superimposing said second light beam (28) on said first light beam (14) and confining said second light beam (28) within said first beam (14).

2. A device as claimed in claim 1, characterized in that said second light source (25) is a laser light source for generating a laser beam (28).

3. A device as claimed in claim 2, characterized in that said superimposing means (34) comprise a reflecting means (34) located along a path of said first light beam (14) for directing said laser beam (28) inside said first light beam (14).

4. A device as claimed in claim 3, characterized in that said light processing means (16, 17, 18, 19) comprise a lens (18) having a focus; and in that said reflecting means (34) is located at the focus of said lens (18).

5. A device as claimed in claim 3, characterized by comprising an actuating means (35) for moving said reflecting means (34) from between a first position along said path of said first light beam (14) and a second position clear of the path of said first light beam (14).

6. A device as claimed in claim 3, characterized in that said reflecting means (34) comprise at least one mirror (34).

7. A device as claimed in claim 2, characterized by comprising controlled-deflection means (26) for controlled deflection of said laser beam (28) to obtain, on targets illuminated by said first light beam (14), images or writing formed by said laser beam (28).

8. A device as claimed in claim 7, characterized in that said controlled-deflection means (26) comprise a pair of movable mirrors (29*a*, 29*b*).

9. A device as claimed in claim 7, characterized in that said controlled-deflection means comprise a pair of mirrors (29*a*, 29*b*) fitted to respective galvanometers (30*a*, 30*b*).

10. A device as claimed in claim 7, characterized by comprising an additional mirror (33) for directing on to said reflecting means (34) said laser beam (28) deflected by said controlled-deflection means (26).

11. A device as claimed in claim 1, characterized by comprising a movable orientable output mirror (23) for directing said first (14) and second (28) light beams in predetermined directions.

* * * * *

UNITED STATES PATENT AND TRADEMARK OFFICE

CERTIFICATE OF CORRECTION

PATENT NO. : 5,988,816
DATED : November 23, 1999
INVENTOR(S) : Pasquale Quadri

It is certified that error appears in the above-identified patent and that said Letters Patent is hereby corrected as shown below:

On the Title Page
In column 2, item [57], replace entire abstract with the following:

--A projector for emitting a light beam of predetermined color and shape that may be directed in a controlled manner and in which a beam of greater intensity and predetermined color is visible and controlled in a manner so as to form writing or images on an illuminated target. The projector comprises a casing which houses a first light source for generating a light beam, a succession of functional assemblies which impart special light effects to the light beam, and an output mirror which deflects the light beam in a controlled manner. The projector casing further houses a laser source for generating a laser beam, a mirror positioned along the laser beam path to superimpose it onto the light beam, and a controlled-deflection unit to deflect the laser beam in a controlled manner to form writing or images on an illuminated target.--

Signed and Sealed this

Nineteenth Day of June, 2001

Nicholas P. Godici

*Attest:*

NICHOLAS P. GODICI

*Attesting Officer* *Acting Director of the United States Patent and Trademark Office*